(12) United States Patent
Dolce et al.

(10) Patent No.: US 12,219,099 B2
(45) Date of Patent: *Feb. 4, 2025

(54) SYSTEM AND METHOD FOR ORDERING A PRINT PRODUCT INCLUDING A DIGITAL IMAGE UTILIZING AUGMENTED REALITY

(71) Applicant: FUJIFILM North America Corporation, Valhalla, NY (US)

(72) Inventors: James Dolce, Penfield, NY (US); Jonathan Nick, Penfield, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,593

(22) Filed: Sep. 6, 2023

(65) Prior Publication Data

US 2023/0421706 A1    Dec. 28, 2023

Related U.S. Application Data

(63) Continuation of application No. 17/833,190, filed on Jun. 6, 2022, now Pat. No. 11,758,059, which is a continuation of application No. 17/239,883, filed on Apr. 26, 2021, now Pat. No. 11,356,568, which is a continuation of application No. 16/202,175, filed on Nov. 28, 2018, now Pat. No. 10,992,826.

(Continued)

(51) Int. Cl.
*H04N 1/00* (2006.01)
*G06F 16/74* (2019.01)
*G06Q 30/0601* (2023.01)

(52) U.S. Cl.
CPC ......... *H04N 1/00145* (2013.01); *G06F 16/74* (2019.01); *G06Q 30/0631* (2013.01); *G06Q 30/0633* (2013.01); *H04N 1/00129* (2013.01); *H04N 1/00164* (2013.01); *H04N 1/00336* (2013.01); *H04N 1/00159* (2013.01); *H04N 1/00167* (2013.01); *H04N 1/0019* (2013.01); *H04N 1/00411* (2013.01)

(58) Field of Classification Search
None
See application file for complete search history.

(56) References Cited

U.S. PATENT DOCUMENTS

| 2015/0346977 | A1* | 12/2015 | Dubois | G06F 3/04842 715/765 |
|---|---|---|---|---|
| 2018/0060006 | A1 | 3/2018 | Hayashi | |
| 2019/0156402 | A1* | 5/2019 | Greenberger | G06Q 30/0643 |

* cited by examiner

*Primary Examiner* — Frantz Bataille
(74) *Attorney, Agent, or Firm* — Woods Oviatt Gilman LLP; Dennis B. Danella, Esq.

(57) ABSTRACT

A method for providing a custom print product comprises displaying a video that includes an exhibited physical product; comparing feature or attribute data associated with the exhibited product with a feature or attribute associated with the available product; displaying a digital overlay in the video and in association with the displayed exhibited product if the displayed exhibited product corresponds to the available product; allowing for the selection of the digital overlay and then a digital image, wherein the selected digital image is not representative of the displayed exhibited physical product, and wherein the selected digital image is configured to be disposed on a selected physical product representative of the displayed exhibited physical product associated with the selected digital overlay to provide the customized print product.

38 Claims, 8 Drawing Sheets

Related U.S. Application Data

(60) Provisional application No. 62/718,601, filed on Aug. 14, 2018.

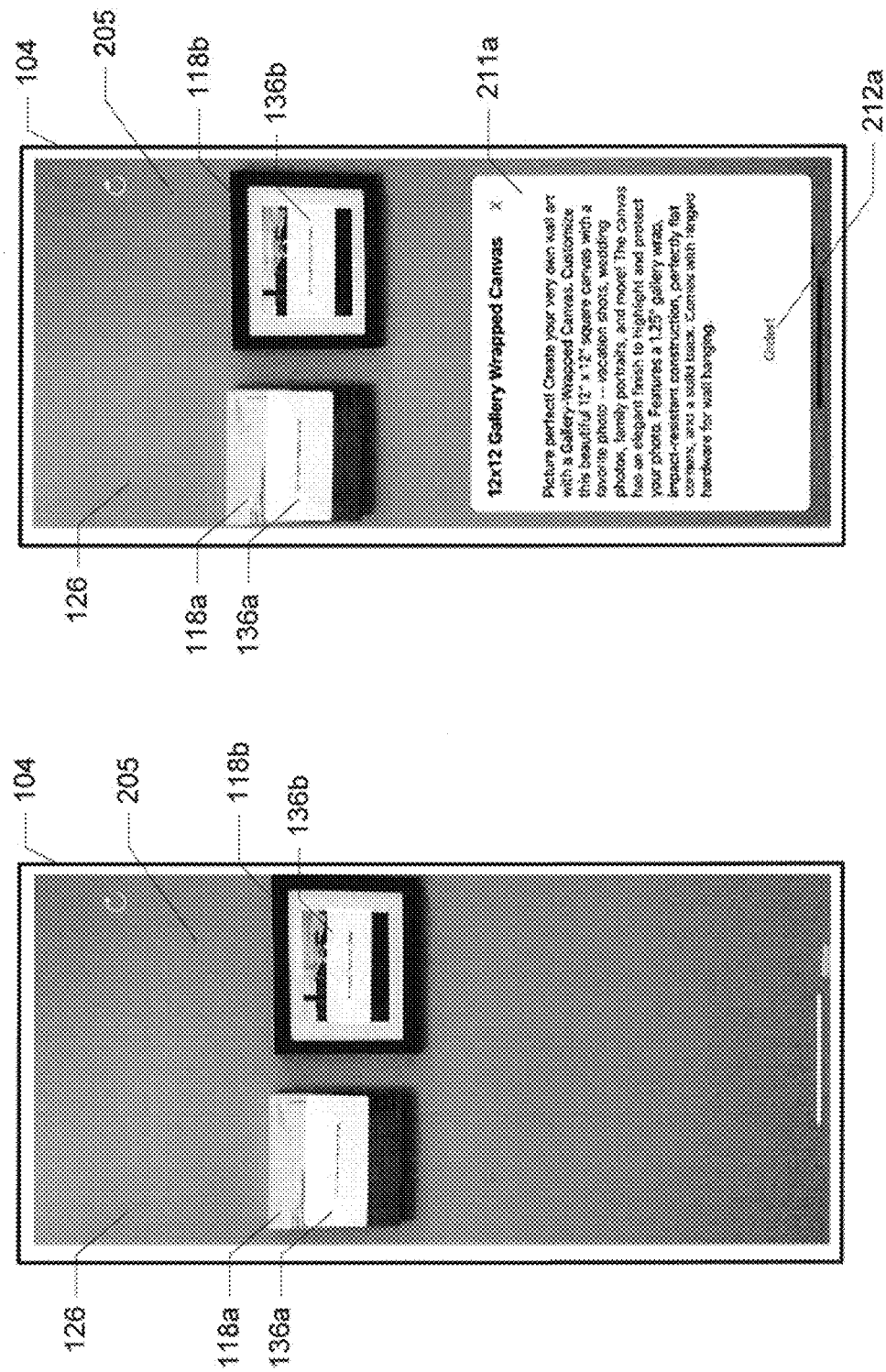

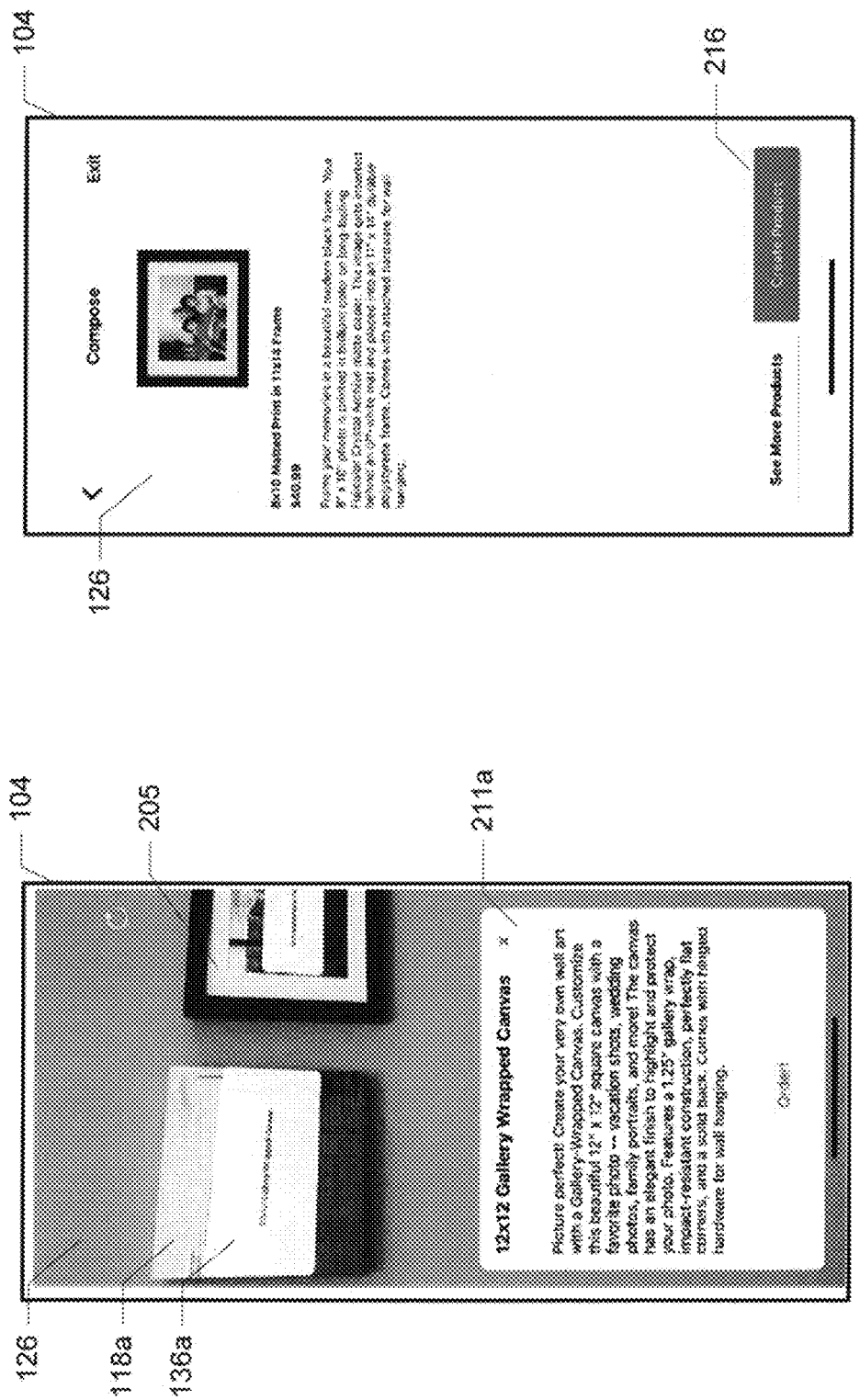

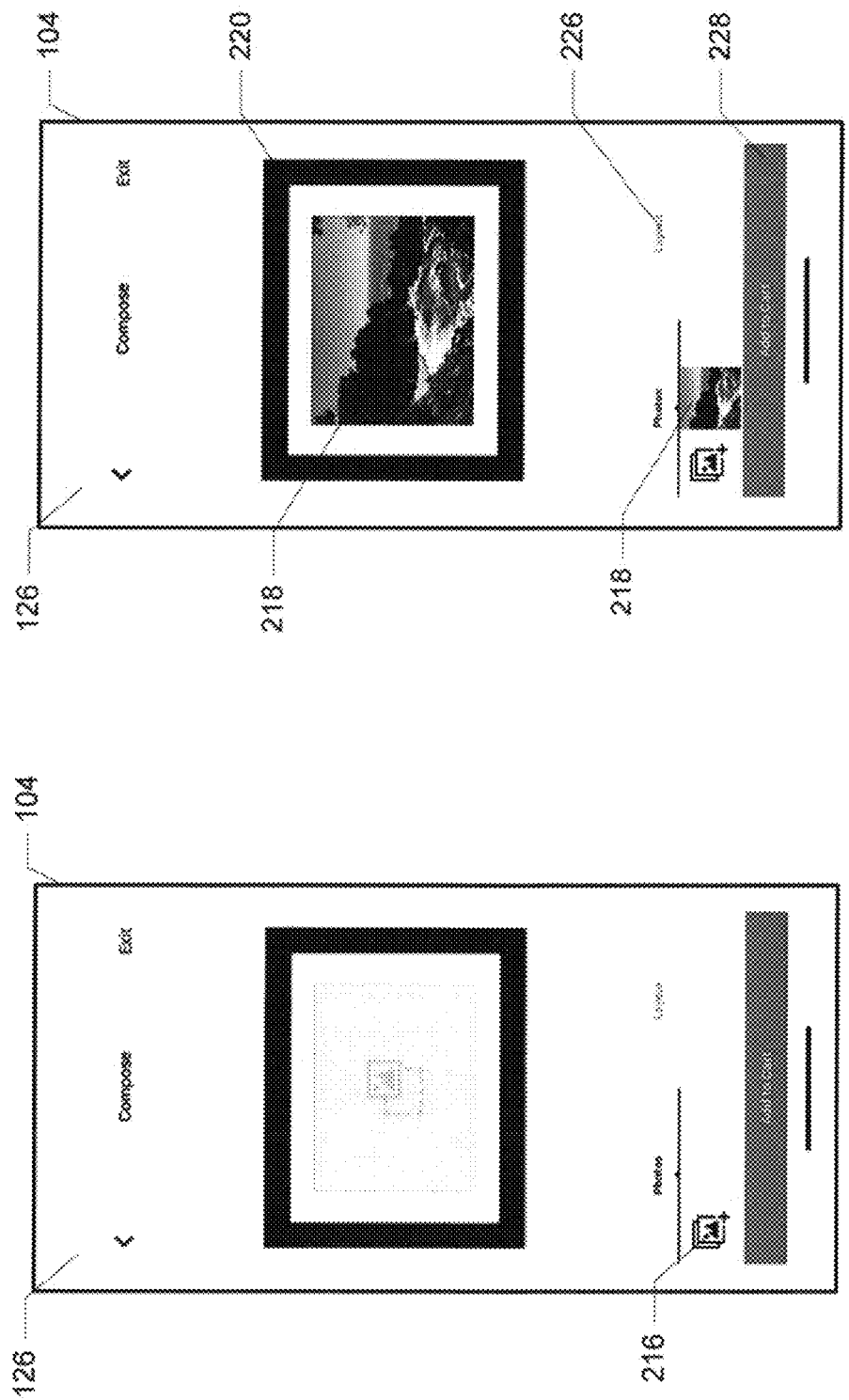

SYSTEM AND METHOD FOR ORDERING A PRINT PRODUCT INCLUDING A DIGITAL IMAGE UTILIZING AUGMENTED REALITY

CROSS-REFERENCE TO RELATED APPLICATIONS

This application is a continuation of U.S. patent application Ser. No. 17/833,190, filed Jun. 6, 2022, now U.S. Pat. No. 11,758,059, which is a continuation of U.S. patent application Ser. No. 17/239,883, filed Apr. 26, 2021, now U.S. Pat. No. 11,356,568, which is a continuation of U.S. patent application Ser. No. 16/202,175, filed Nov. 28, 2018, now U.S. Pat. No. 10,992,826, which in turn claims the benefit of U.S. Patent Application No. 62/718,601, filed on Aug. 14, 2018, the contents of all of which are hereby incorporated by reference in their entirety.

FIELD OF THE INVENTION

The present invention is directed to a system and method for providing a custom print product including a digital image utilizing augmented reality; in particular, the present invention utilizes a method that recognizes an exhibited physical product being displayed in a video on a display of a mobile computing device, identifies a digital overlay associated with the recognized exhibited physical product, displays the identified digital overlay in association with the recognized exhibited physical product in the video on the display, and provides for the selection of the digital overlay to allow for the display of information related to the exhibited physical product and ordering of a print product including a digital image selected using the mobile computing device.

BACKGROUND OF THE INVENTION

Photo kiosks are an interactive computer-based platform that may be physically located within retail stores, drug stores and grocery stores (hereinafter "retail store location"). They are a convenient platform because they offer a customer the ability to upload digital images located in the user's mobile computing device or access digital images that were previously uploaded by the customer to the kiosk or third party social media website, and customize a print product using the uploaded digital images without having to interact with store personnel. This allows the user to take the necessary time to select a print product without being pressured. Further, depending on the capabilities of the kiosk and the print product ordered by the consumer, the kiosk may include a printing device that allows for the fulfillment of the print product on the spot. For example, a kiosk may be capable of instantly printing various sized image prints while the consumer waits providing instant satisfaction to the consumer.

While photo kiosks provide many advantages to the consumer, they do provide some drawbacks. For instance, when a customer is using a kiosk to select a product to associate with a digital image, the product is typically presented in digital form on a display of the kiosk. Viewing the product in digital form could make it difficult for the customer to envision the actual physical dimensions of the product and create hesitation on the part of the consumer to purchase the product. This results in underutilization of kiosks. Also, there is a significant cost in designing, manufacturing, and integrating a kiosk into a photofinishing system. Kiosks include many of the same hardware components and peripherals that are in a typical computing device, with the addition of an integrated printing device that is configured to produce print products on the spot. It is not uncommon for kiosks to be placed in multiple retail store locations for a given retail chain, and the total cost of providing kiosks at each of these locations is substantial. When a kiosk is installed in a retail store, it is typically placed in a high-traffic, premium location so that it can attract the attention of customers and be easily accessible for use. This premium floor space that the kiosk occupies is valuable and potentially is taking away from the retailer's ability to sell other products.

Accordingly there is a need for a system and method for ordering a print product while located in a retail store location without the need to use a kiosk. The present invention fills these needs as well as other needs.

SUMMARY OF THE INVENTION

In one aspect, the present invention includes a computer-implemented method programmed for execution in a computing environment for providing a custom print product. The method comprises: a) storing a digital representation of an available product in a memory; b) displaying a video that includes an exhibited physical product (e.g., image print, calendar, mug, photo book, poster, blanket, phone case, pillow, clothing, or jewelry); c) comparing one or more feature or attribute associated with the exhibited physical product being displayed in the video with feature data or attribute data associated with the available product; d) upon determining that the displayed exhibited physical product corresponds to the available product, displaying a digital overlay in the video and in association with the displayed exhibited physical product, wherein the digital overlay may include a description of the displayed exhibited physical product; e) allowing for the selection of the digital overlay being displayed in the video; f) in response to the selection of the digital overlay, allowing for the selection of a digital image, wherein the selected digital image is not representative of the displayed exhibited physical product, and wherein the selected digital image is configured to be disposed on a selected physical product representative of the displayed exhibited physical product associated with the selected digital overlay to provide the customized print product.

In another aspect, the present invention may utilize image and/or object recognition to compare the exhibited physical product being displayed in the video with the digital representation of the available product. In the instance that image recognition is used, the feature data of the available product may include a stock digital image, wherein the one or more feature of the exhibited physical product is a stock image, wherein step c) includes scanning the displayed exhibited physical product to identify the stock image disposed thereon. The displayed exhibited physical product corresponds to the digital representation of the available product when the stock image matches the stock digital image.

In the instance that object recognition is used, the attribute data may include at least one dimension of the available product, wherein step c) includes scanning the displayed exhibited physical product to identify at least one dimension of the displayed exhibited physical product. The displayed exhibited physical product corresponds to the available product when the at least one dimension of the displayed exhibited physical product matches the at least one dimension of the available product. In addition, or alternatively to, using at least one dimension, the attribute data may include at least one shape of the available product, wherein step c) includes scanning the displayed exhibited physical product to identify the at least one shape of the displayed exhibited physical product. The displayed exhibited physical product corresponds to the available product when the at least one shape of the displayed exhibited physical product matches the at least one shape of the available product.

In another aspect, the step of displaying the digital overlay in association with the displayed exhibited physical product includes superimposing the digital overlay on top of the displayed exhibited physical product, and/or above, below, right, left, or diagonal of the displayed exhibited physical product. Further, the digital overlay may be displayed in the same perspective as the exhibited physical product is displayed in the video so that the digital overlay appears in the video in augmented reality. Therefore, as the camera is moved to change the angle at which the exhibited product is being displayed on the user interface of the mobile computing device, the perspective appearance of the digital overlay changes in unison with the perspective appearance of the associated exhibited physical product.

Further, the methods referred to above may be embodied in computer readable instructions stored on a non-transitory computer readable medium.

In yet another aspect, a computing system for providing a custom print product is provided. The system may comprise a first memory for storing computer-executable instructions, a camera configured for capturing a video, a display configured for displaying the video, and a processor configured for executing the computer-executable instructions to perform the following steps: a) utilizing the camera to display a video that includes an exhibited physical product; b) comparing one or more feature or attribute associated with the exhibited physical product being displayed in the video with feature data or attribute data associated with an available product, wherein the feature data or attribute data is stored in a server memory of a server, wherein the server is in communication with the processor over a network; c) upon determining that the displayed exhibited physical product corresponds to the available product, displaying a digital overlay in the video and in association with the displayed exhibited physical product, wherein the digital overlay may include a description of the displayed exhibited physical product; d) allowing for the selection of the digital overlay being displayed in the video on the display; e) in response to the selection of the digital overlay, allowing for the selection of a digital image to customize the displayed exhibited physical product, wherein the selected digital image is not representative of the displayed exhibited physical product, and wherein the selected digital image is configured to be disposed on a selected physical product representative of the displayed exhibited physical product associated with the selected digital overlay to provide the customized print product.

In a further aspect, a computing system for providing a customized print product is provided. The system comprises a first memory for storing computer-executable instructions; a camera configured for capturing a video; a display configured for displaying the video; and a processor configured for executing the computer-executable instructions to perform the following steps: a) utilizing the camera to display a video that includes an exhibited physical product; b) comparing one or more feature or attribute associated with the exhibited physical product being displayed in the video with feature data or attribute data associated with an available product, wherein the feature data or attribute data is stored in the first memory of a server; c) upon determining that the displayed exhibited physical product corresponds to the available product, displaying a digital overlay in the video and in association with the displayed exhibited physical product; d) allowing for the selection of the digital overlay being displayed in the video on the display; and e) in response to the selection of the digital overlay, allowing for the selection of a digital image to customize the displayed exhibited physical product, wherein the selected digital image is not representative of the displayed exhibited physical product, and wherein the selected digital image is configured to be disposed on a selected physical product representative of the displayed exhibited physical product associated with the selected digital overlay to provide the customized print product.

In another aspect, a computing system for providing a customized print product is disclosed herein. The system comprises a first memory for storing computer-executable instructions; a camera configured for capturing a video; a display configured for displaying the video; and a processor configured for executing the computer-executable instructions to perform the following steps: a) utilizing the camera to display a video that includes an exhibited physical product; b) comparing one or more feature or attribute associated with the exhibited physical product being displayed in the video with one or more feature or attribute associated with a digital representation of an available product stored in the first memory; c) upon determining that the displayed exhibited physical product corresponds to the digital representation of the available product, displaying a digital overlay in the video and in association with the displayed exhibited physical product; d) allowing for the selection of the digital overlay being displayed in the video on the display; and e) in response to the selection of the digital overlay, allowing for the selection of a digital image to customize the displayed exhibited physical product, wherein the selected digital image is not representative of the displayed exhibited physical product, and wherein the selected digital image is configured to be disposed on a selected physical product representative of the displayed exhibited physical product associated with the selected digital overlay to provide the customized print product.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein:

FIGS. 3-12 are exemplary screen shots from a mobile computing device when used in accordance with the method set forth in FIG. 2.

DETAILED DESCRIPTION OF THE INVENTION

Figure 1:
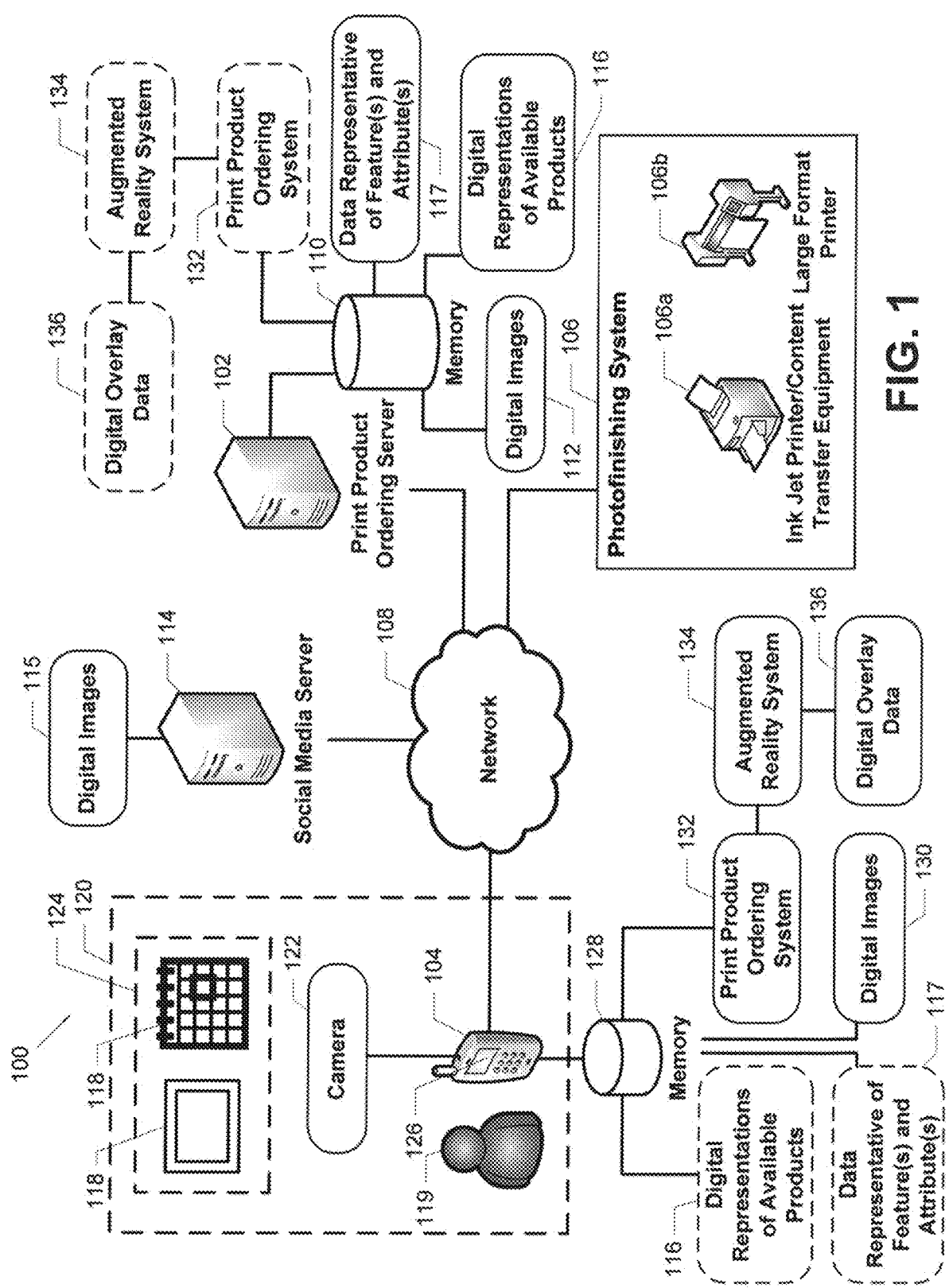
FIG. 1 is a system diagram generally illustrating various components that may be utilized for the implementation of one or more aspects of the present invention.

Generally, the systems and methods described herein for ordering a print product including a digital image using augmented reality may be implemented in hardware, software or a combination thereof, and may be distributed across a variety of computing devices.

This document is organized as follows. In the first section, an overview of the techniques and implementation in accordance with one embodiment of the invention. In the next sections, an exemplary system and algorithms for providing aspects of the present invention are discussed. Following this, an exemplary computer environment for the implementation and use of the invention is described.

In general, the present invention provides a computer-implemented method in the form of computer-executable instructions programmed for allowing a consumer (hereinafter "user") to order a print product including a digital image using a mobile computing device. The method may include allowing for a camera on the mobile computing device to take a video of a physical product being exhibited on a shelf or end cap, or in another location, in a retail store location, for example. It should be understood that the exhibited physical product ("exhibited product") may include, but is not limited to, a real-life three-dimensional product such as a calendar, mug, photo book, poster, blanket, phone case, pillow, clothing, or jewelry. The real-life three-dimensional product may be a full-scale model of the product, or some other scaled version thereof. The exhibited product may also be a two-dimensional illustration of one or more products (e.g., calendar, mug, photo book, poster, blanket, phone case, pillow, clothing, or jewelry) displayed on a two-dimensional image print, such as a poster display board (e.g., 18"×24"). The use of the image print allows for the display of the products at multiple locations within a retail environment without having to put any three-dimensional product products on display.

The method then operates to scan the exhibited product and use image and/or object recognition to determine if the exhibited product is a product available to be used to fulfill a print order ("available product"). In one aspect, the recognition may be performed by comparing at least one scanned feature (e.g., image) or attribute (e.g., size, shape, dimensions) of the exhibited product with one or more feature or attribute corresponding to available products stored in a memory. In the instance that an image print is used to display a two-dimensional illustration of the one or more exhibited products, it is the products illustrated in the image print that are scanned for purposes of image and/or object recognition. Upon determining that the exhibited product matches an available product, an augmented reality system is used to display a digital overlay in the video and in association with the exhibited product being displayed on the mobile computing device. The digital overlay may include text, numbers, symbols, or any other type of information, including but not limited to information related to the available product. It should also be understood that the digital overlay may alternatively include no information. The method further allows for the digital overlay to be selected by using a touch screen on the mobile computing device, for example. By selecting the digital overlay, the method may allow for additional detailed information to be displayed related to the available product. Subsequent to the display of the digital overlay, the method allows for a digital image to be selected by the user. The digital image that is selected would be a digital image that the user desires to have disposed on the product to provide a print product. The method then may use a print product ordering system to generate a print order thereafter allow for the fulfillment of the print product by a photofinishing system. Other aspects of the present invention will be described in more detail below.

Referring now to FIG. 1, an exemplary system that may be used to implement the methods and aspects described herein is identified as reference number 100. System 100 may comprise one or more of a print product ordering server 102, a mobile computing device 104, and a photofinishing system 106 that are in communication over a network 108. Network 108 may be any type of network, such as a wide area network (WAN) or local area network (LAN) through a wired or wireless connection. In one aspect as described below, server 102 and mobile computing device 104 operate in conjunction with one another to accomplish the functionality provided by the methods described herein. However, it should be understood that it is also within the scope of the present invention to have mobile computing device 104 perform one or more operations that are provided by server 102.

Server 102 includes a memory 110 that is configured for storing one or more digital images 112 that are transferred or otherwise communicated from mobile computing device 104 or some other remote computing device (e.g., desktop computing device) over network 108. The transfer of digital images to server 102 may also be from an external storage location, such as a remote social media server 114 or website (e.g., INSTAGRAM® and (PHOTO®) or cloud-based memory location when such a transfer is authorized by a user or otherwise permitted using mobile computing device 104. Memory 110 may also include one or more digital representations of available products 116 that are available to be used to produce a print product. The available products may include, but are not limited to, an image print, card, invitation, frame, calendar, canvas, wall art, mug, photo book, poster, blanket, phone case, laptop sleeve, tablet sleeve, tote, pouch, coaster, placemat, plate, magnet, pillow, towel, clothing, jewelry, jewelry box, toy, and any other product or substrate (wood, metal, paper, etc.) where an image can be disposed thereon or associated therewith. A print product is defined as an available product including a digital image disposed thereon or associated therewith, wherein the digital image may be provided by a customer or obtained from another source. The utilization of the digital representations of available products 116 stored in memory 110 will be discussed in more detail below.

Memory 110 may also include data representative (e.g., list) of one or more features or attributes of each product 117 that is available to be used to produce a print product. A feature of an available product may be, for example, a stock digital image that corresponds to an available product. A attribute of an available product may be one or more dimensions or shapes that are associated with an available product. The features and attributes may be used in conjunction with image and/or object recognition to identify an exhibited product using the methods described herein.

Server 102 may further include a processor that is configured for executing computer executable instructions that are provided to perform the operations and functions described in detail below.

Mobile computing device 104 may be any type of computing device that is capable of being operated by a user 119, and communicating with server 102 over network 108, such as, but not limited to, a smartphone, tablet, IPHONE, etc. Computing device 104 is "mobile" in that it can be transported or moved by user 119 into and around a retail store location or any other location (hereinafter referred to as "retail store location 120"). As such, mobile computing device 104 may be in communication with network 108 via a WAN wireless connection (e.g., broadband) or a LAN wireless connection (e.g., Wi-Fi), for example. Mobile computing device 104 includes a camera 122 that is configured to capture a video of one or more physical products 118 being exhibited anywhere in retail store location 120, including on a shelf or end-cap 124. It should be understood that the capturing of the video includes taking the video for real-time viewing. In particular, mobile computing device 104 may further include a user interface or display 126 (hereinafter "user interface") for displaying the real-time video of the one or more exhibited products 118 to user 119 as camera 122 is being used to take the video. In another aspect, the video that is captured by camera 122 may be stored in a memory 128 of mobile computing device 104, for example, for use with the system and method set forth herein. Memory 128 may also be included in mobile computing device 104 to store one or more digital images 130 that may be incorporated or otherwise used to produce a print product. Digital images 130 may have been captured using camera 122 of mobile computing device 104, downloaded from external storage location 114, or downloaded from memory 110, 112 of server 102. Likewise, digital images 130 may be uploaded to external storage location 114 or memory 110, 112 of server 102 so that they can be later accessed by system for generating a print product using the method of the present invention. It is also contemplated that the digital representations 116 of available products and/or data representative of one or more features or attributes for each available product 117 be stored in memory 128 of mobile computing device 104 instead of, or in addition to, storing them in memory 110 of server 102.

Mobile computing device 104 may also include a print product ordering system 132 stored in memory 128. Print product ordering system 132 may be configured to associate at least one of the stored digital images 112, 115, 130 ("digital image") with a digital representation of an available print product 116 to form a digital representation of the resulting print product for display on user interface 126. The association of the digital image and the digital representation of the available product provides user 119 with a visual representation of how the digital image will look on an available product if it were ordered and fulfilled. Print product ordering system 132 may also operate to allow for an association of a digital image with an available product without displaying a visual representation of the resulting print product. The digital image 112, 115, 130 used by print product ordering system 132 may be obtained from memory 128 of mobile computing device 104, memory 110 of server 102, or downloaded to memory 128 from external storage location 114.

Print product ordering system 132 is further configured to allow user 119 to establish a print order including the selected print product and the associated digital image to be disposed thereon. Once the print order is established, print product ordering system 132 proceeds to allow for the payment of the print order and allow for the selection of a delivery method. When it comes time to fulfill the print order by producing the print product including the digital image, system 100 may communicate the print order to photofinishing system 106 over network 108. The determination as to what type of printing device will be used to fulfill the print order may be determined based on the capabilities of printing devices 106a, 106b and/or the supply of the printing substrates (selected print product) that are currently available to printing devices 106a, 106b. It should be understood that printing devices 106a, 106b illustrated in FIG. 1 are merely exemplary and may take other forms depending on the print product selected by user 119.

Print product ordering system 132 may further include a payment processing module that allows user 119 to provide payment for the fulfillment and/or delivery of the print order. For example, payment processing module may be configured to use mobile computing device 214 to communicate the necessary information (e.g., name, address, and/or credit card information) to pay for the print order. Payment may be provided through print product ordering server 102 or through a third party payment processing system without passing any payment information to the print product ordering server 102. Once a payment authorization is received by print product ordering server 102, instructions may then be communicated to photofinishing system 106 so that the print order can be fulfilled by an appropriate printing device 106a, 106b.

System 100 further includes an augmented reality system 134 that is provided to facilitate the selection of product 118 during the use of print product ordering system 132. In one aspect, when camera 122 of mobile computing device 104 is being used to capture a real-time video of one or more physical products 118 being exhibited in retail store location 120, augmented reality system 134 is configured to scan the captured real-time video and utilize image and/or object recognition to identify any available products that may be present in the captured video.

In the instance that image recognition is utilized in augmented reality system 134, each of the products 118 being exhibited in retail store location 120 may include a stock image disposed thereon, such as, for example, a picture or a text phrase (e.g., "personalize me"). The stock images on each of the products 118 are preferably different in one or more respects (e.g., different images, different font style for text phrases, etc.) to allow for better differentiation between the products 118 and improve product identification success rate. Further, the digital representations of available products 116 may each include one or more features associated therewith, such as a stock digital image. For example, each of the digital representations of available products 116 may be associated with a different stock digital image. As the video of one or more physical products 118 being exhibited in retail store location 120 is captured, augmented reality system 134 may be configured to scan each of the displayed physical products 118 to identify the respective stock images disposed thereon. Each of the respective identified stock images are then compared with the stock digital images associated with the digital representations of available products 116. If an identified stock image of a displayed physical product 118 matches a stock digital image on a digital representation of an available product 116, then augmented reality system 134 determines that the respective displayed physical product 118 corresponds to a respective digital representation of an available product 116. Augmented reality system 134 is then configured to retrieve a digital overlay 136 associated with the respective digital representation of the available product 116 corresponding to the identified physical product 118, and display the retrieved digital overlay 136 in the video and in association with the physical product 118 being displayed on the user interface 126. Digital overlay 136 may include any type of information or no information. For example, digital overlay 136 may include information such as, but not limited to, a description of the physical product 118 in the form of text, video and/or audio description of the product, for example. The description of the product may include a general identification of the product, such as, but not limited to, "5×7 frame," "2018 calendar," "mug," etc. Other information related to the product, or not related to the product, may also be provided.

The digital overlay 136 may be displayed in association with the physical product 118 in the video on the user interface 126 by, for example, being superimposed on top of the displayed physical product 118, and/or above, below, right, left, or diagonal of the displayed exhibited physical product 118. Further, augmented reality system 134 may be configured to display digital overlay 136 as a three-dimensional rendered object in the video as if digital overlay 136 is actually physically on top of the physical product 118 or otherwise associated with physical product 118 in the displayed video. As such, when user 119 moves camera 122 when displaying physical product 118 on user interface 126, the perspective appearance of digital overlay 136 on user interface 126 changes along with the displayed physical product 118. This gives user 119 the impression that the displayed digital overlay 136 is actually in the same environment as physical product 118 in retail store location 120. Data representative of each digital overlay 136 may be stored in memory 124 of mobile computing device 104 and/or memory 110 of server 102. Augmented reality system 134 is also configured for allowing digital overlay 136 to be selected using user interface 126 of mobile computing device to display additional detailed information related or unrelated to the respective physical product 118, and/or allow user 119 to proceed with ordering a print product made up of a product corresponding to the selected physical product 118 and a digital image to be selected by user 119 using the print order ordering system 132 as described herein. The additional detailed information related to the respective physical product 118 may include characteristics of the product including, but not limited to, dimensions, shape, materials, cost, and other attributes related to the product.

It should be understood that augmented reality system 134 operates in a similar manner as described above if object recognition is utilized to scan physical product 118 being displayed in the video, and compare the scanned physical product 118 with one or more attributes of the digital representations of available products 116. Instead of a respective stock digital image being associated with each of the digital representations of available products 116, the digital representations of available products 116 would be associated with one or more attributes, such as, but not limited to, at least one dimension or shape that is unique to a particular product that will allow augmented reality system 134 to identify the physical product 118 being displayed in the video being taken in the retail store location 120. For example, each respective digital representation of available products 116 would be associated with certain dimensions. Therefore, if a physical product 118 displayed in a video taken by mobile computing device 104 is scanned and is determined to have dimensions of 3"×5", for example, then these dimensions would be compared with the dimensions associated with the digital representations of available products 116 to identify which available product(s) match these dimensions. It should be understood that the dimensions can be taken along one, two or three axes. Once it is determined which available product corresponds to the displayed physical product 118, then the digital overlay associated with the identified available product is displayed in the video and in association with the displayed physical product 118, as was previously described. This same methodology applies by using at least one shape of the physical product 118 displayed in the video during the object recognition process. Each digital representation of the available products 116 could have a unique shape that is used to identify the physical product 118 being displayed in the video. The shape could also include information related to the proportions of a given object. For example, one unique shape of an available product 116 could be a rectangle with proportions of 3:5, which would be indicative of a 3×5 frame product. Another shape could be two squares positioned adjacent to one another, which could be indicative of a calendar. It should be understood that the above mentioned examples are merely exemplary, and any other shape, proportion, dimension may be used to accomplish the methods described herein.

While print product ordering system 132 and augmented reality system 134 is shown in FIG. 1 as being stored in memory 128 of mobile computing device 104, it should be understood that print product ordering system 132 and/or augmented reality system 134 may be stored in memory 110 of server 102. Also, print product ordering system 132 and augmented reality system 134 are not limited to any specific hardware or software configuration, but may rather be implemented as computer executable instructions in any computing or processing environment, including in digital electronic circuitry or in computer hardware, firmware, device driver, or software.

Figure 2:
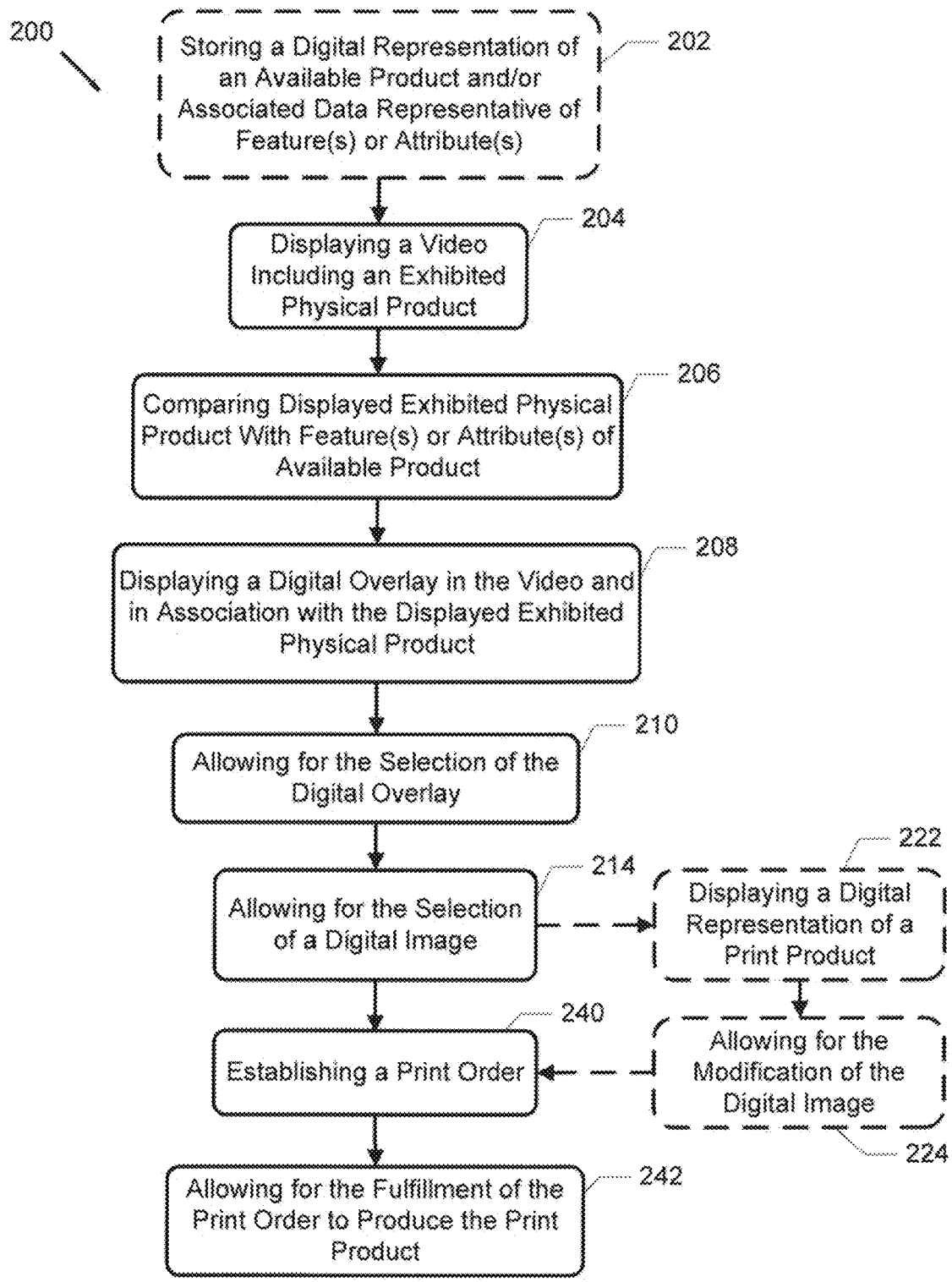
FIG. 2 is a flow chart illustrating an exemplary method for implementing one or more aspects of the present invention.

FIG. 2 is a flow diagram showing an exemplary method 200 that may be implemented using system 100 in accordance with one aspect of the present invention. FIGS. 3-12 are exemplary screen shots from mobile computing device 104 displayed on user interface 126 during the implementation of method. The aforementioned screen shots will be referred to throughout the discussion set forth below to illustrate an exemplary implementation of method 200.

Method 200 is computer-implemented and programmed for execution in a computing environment for ordering a print product. As best seen in FIG. 2, method 200 may comprise a step 202 of storing at least one digital representation of an available print product. As previously described, each digital representation of the available print products may be associated with data representative of one or more feature or attribute (e.g., unique stock image, dimension and/or shape) that allows for the identification of an exhibited physical product that is displayed in a video using the mobile computing device 104. Thus, step 202 could also include storing of the data representative of the one or more features or attributes. It is also contemplated that the method provide for the storage of the data representative of one or more feature or attribute that allows for identification of one or more available print products, without storing at least one digital representation of the one or more available print products. Next, in step 204, method 200 allows for camera 122 of mobile computing device 104 to be used to capture a real-time video 205 of at least one physical product 118a, 118b being exhibited in retail store location 120, and displaying real-time video 205 on user interface 126 of mobile computing device 104, as seen in FIG. 3.

Augmented reality system 134 is then utilized to scan video 205 displayed on user interface 126 to identify any exhibited physical products 118a. 118b displayed in video 205, and use image and/or object recognition to compare the physical products 118a, 118b being displayed in video 205 with features and/or attributes of available products 116, at step 206. If it is determined that one or more of physical products 118a, 118b being displayed in video 205 correspond to certain digital representations of available products 116, augmented reality system 134 is utilized to retrieve data representative of a respective digital overlay 136 that corresponds to the identified physical products 118a, 118b stored in memory 128 and/or server 102. At step 208, method 200 includes using the retrieved data 136 to display the respective digital overlays 136a, 136b in association with the respective physical product 118a, 118b on user interface 126, as best seen in FIG. 3. At step 210, method 200 further allows for the selection of any of the digital overlays 136a, 136b being displayed in video 205. For example, user 119 may select either digital overlay 136a or digital overlay 136b by physically touching the respective digital overlay using a touch screen feature on user interface 126. Other methods of selecting the respective digital overlay are also contemplated herein.

Figure 6:
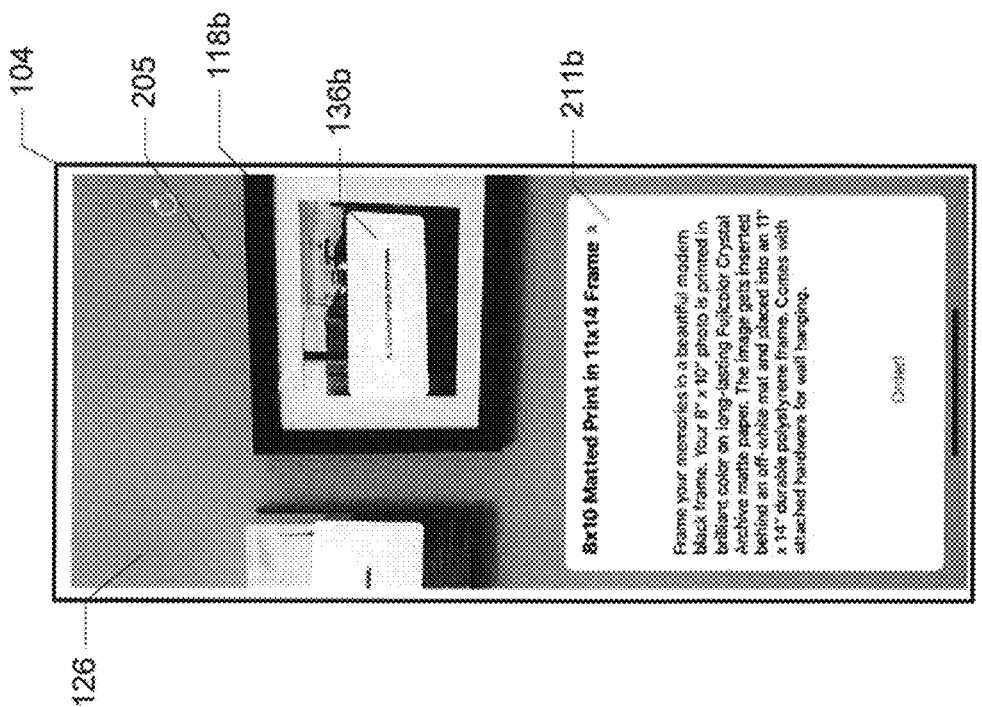
Figure 5:
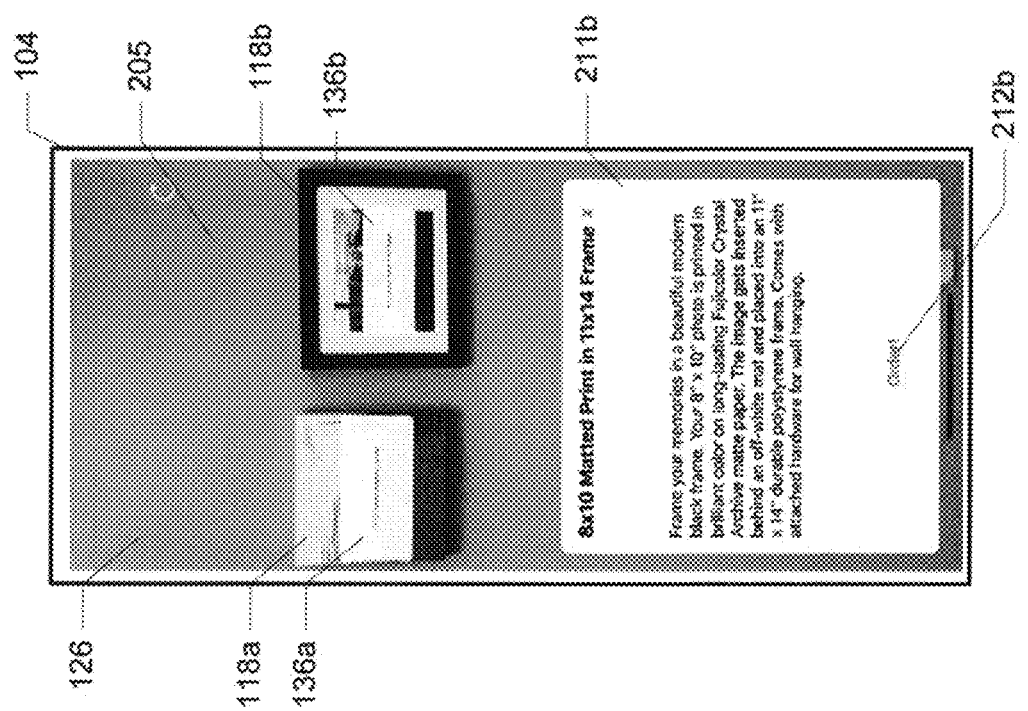

As seen in the progression from FIG. 5 to FIG. 6, and from FIG. 5 to FIG. 7, augmented reality system 134 may operate to associate (e.g., superimpose, position above, below, right, left, or diagonal) digital overlays 136a, 136b with physical products 118a, 118b being displayed in video 205, and allow for the perspective appearance of digital overlays 136a, 136b to change to match the perspective appearance of physical products 118a, 118b displayed on user interface 126. The perspective appearance of both the physical products 118a, 118b and the associated digital overlays 136a, 136b may change in unison as the angle and/or position of camera 122 changes relative to physical products 118a, 118b in retail store location 120. This feature gives user 119 the impression that digital overlays 136a, 136b are actually in the same physical environment as physical products 118a, 118b to enhance the product ordering experience for user 119.

In one aspect, selecting digital overlay may result in the display of additional information related to the respective identified product. For example, selection of digital overlay 136a may result in the display of an additional window 211a as best seen in FIG. 4, and selection of digital overlay 136b may result in the display of an additional window 211b as best seen in FIG. 5. As previously mentioned, the additional detailed information related to the respective physical product 118a, 118b may include characteristics of the product including, but not limited to, dimensions, shape, materials, cost, and other attributes related to the product. In either of the additional windows 211a, 211b an order button 212a, 212b may be displayed to allow user 119 to proceed with ordering a print product. For example, a screen such as that shown in FIG. 8 may be displayed on user interface 126 after order button 212b is selected, which allows user to proceed with selecting a digital image at step 214 by selecting the "Create Product" button 216. It should be understood that instead of displaying additional window 211 and/or the screen shown in FIG. 8 after selecting a digital overlay, it is contemplated that method 200 proceed directly to allowing for the selection of a digital image at step 214.

At step 214, method 200 further allows for the selection of a digital image to be disposed on or otherwise incorporated with a selected physical product. For example, as best seen in FIG. 9, user 119 may use a button 216 that allows for the selection of one or more digital images. One or more digital images 218 may be retrieved from memory 110, 114 and/or 128. As best seen in FIG. 10, for example, after digital image 218 is selected, a digital representation 220 corresponding to the product 118b associated with the selected digital overlay 136b may be optionally displayed on user interface 126 including the selected digital image 218, at step 222, to show user 119 what the print product would look like if fulfilled. While in the example shown in FIGS. 5-7 shows physical product 118b as including a unique stock image, it should be understood that the digital representation 220 includes the selected digital image 218 in place of the unique stock image. In another aspect, augmented reality system 134 may be used to display the selected digital image 218 in augmented reality so that it is superimposed on top of the stock image on, and/or above, below, right, left, or diagonal of, the exhibited physical product 118a being displayed in video 205. This allows the physical product 118a being displayed in video 205 to be shown in association with the selected digital image 218. Displaying digital representation 220 in the manner shown in FIG. 10, or in augmented reality within a displayed video, will allow user 119 to view the selected product (e.g., 11"×14" frame) and digital image 218 in a real environment to give user 119 an idea of what the print product will look like if fulfilled by photofinishing system 106.

At step 224, method 200 may allow for digital image 218 to be modified. For example, the digital image may be modified through a function that allows for cropping, panning, enlarging, and/or rotating. Digital image 218 may also be modified to include changes to color characteristics, such as, but not limited to, brightness, saturation, hue, contrast, red eye, etc. Further, if the product selected by user 119 allows for the incorporation of multiple digital images (e.g., calendar), method 200 may optionally allow for a layout 226 of the selected digital images to be modified. Modification of digital image 218 may also include any other type of editing feature, including but not limited to utilizing digital image 218 in conjunction with one or more filters, templates, or other adjustments.

Figures 11, 12:
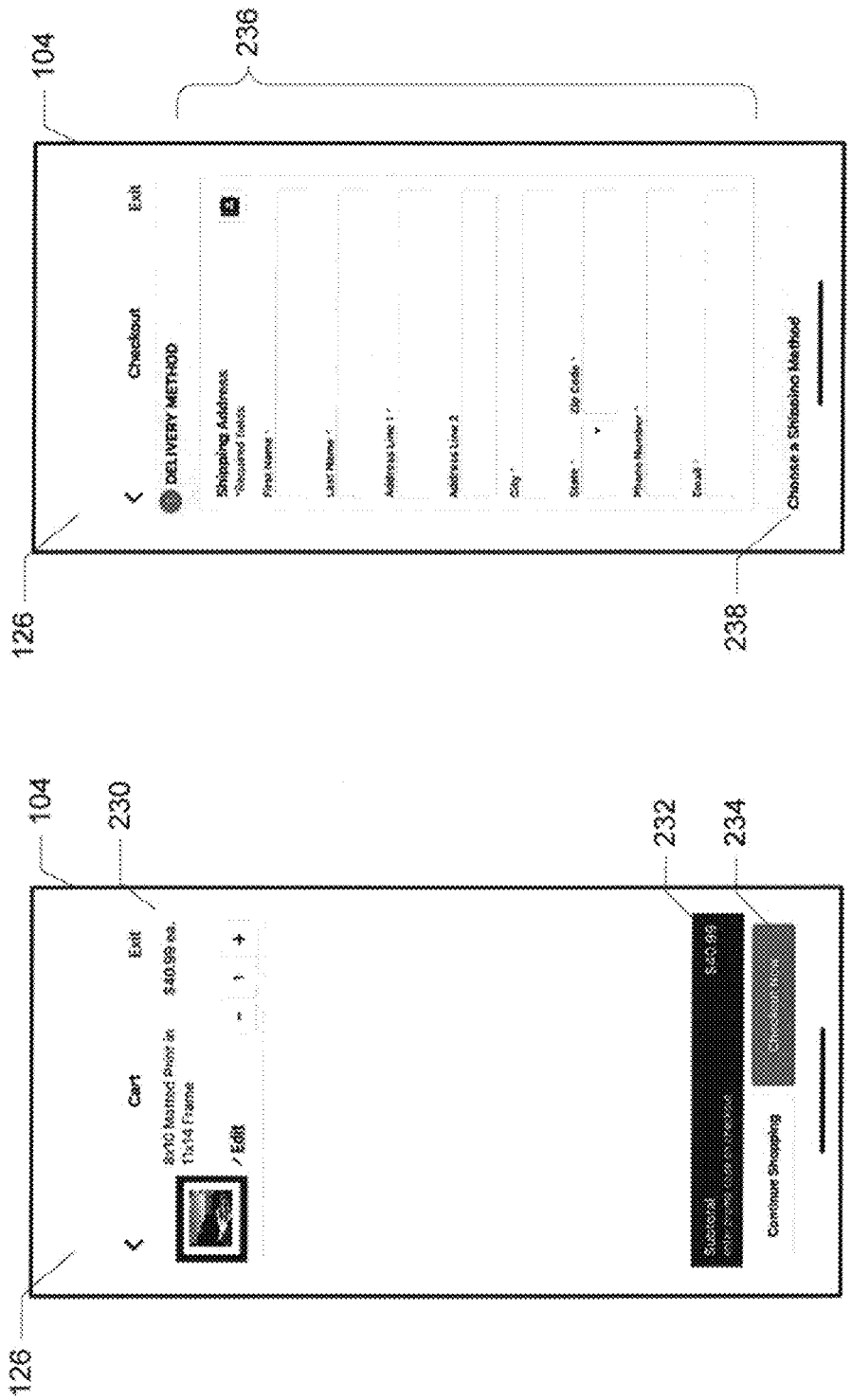

Once user 119 is finished selecting one or more digital images 218, an "Add to Cart" button 288 may be selected which results in an order summary 230 being displayed on user interface 126 including the display of an order cost 232, as best seen in FIG. 11. A "Check Out" button 234 may then be selected so that user 119 may provide payment information (e.g., name, credit card information) as well as shipping address 236 and shipping method 238, as seen in FIG. 12. Method 200 further includes a step 240 of establishing a print order including an identification of the displayed exhibited physical product 118b associated with the selected digital overlay 136b (i.e., the selected product) and the selected digital image 218. The identification of the selected product can be the name of the selected product, for example, 11"×14" picture frame, so photofinishing system 106 knows what product it needs to use in conjunction with the selected digital image to produce the print product. In the instance that the displayed exhibited physical product 118b associated with the selected digital overlay 136b includes a stock image disposed thereon, it should be understood that the identification in the print order need not include any information related to the stock image since the user selected digital image will be used to produce the print product. Further, it should be understood that the print order may also include an identification of the location of digital image 218 so that digital image 218 may be retrieved when fulfilling the print order. In the alternative, the print order can include a data file containing digital image 218.

Method 200 further includes a step 242 of allowing for the fulfillment of the print order to produce the print product. In particular, the print order may be communicated from mobile computing device 104 and/or server 102 to photofinishing system 106 over network 108. The appropriate printing device 106a, 106b may then be used to produce the print product depending on the capabilities of printing devices 106a, 106b and the availability of such printing devices 106a, 106b. For example, the print product produced by the photofinishing system 106 will include the selected digital image 218 disposed on the selected physical product that corresponds to the displayed exhibited physical product 118b associated with the selected digital overlay 136b.

In another aspect, it should be understood that the methods set forth above may be embodied in computer readable instructions stored on a non-transitory computer readable medium.

Having described the system and method of the present invention and an embodiment thereof, an exemplary computer environment for implementing the described design and execution is presented next.

Figure 13:
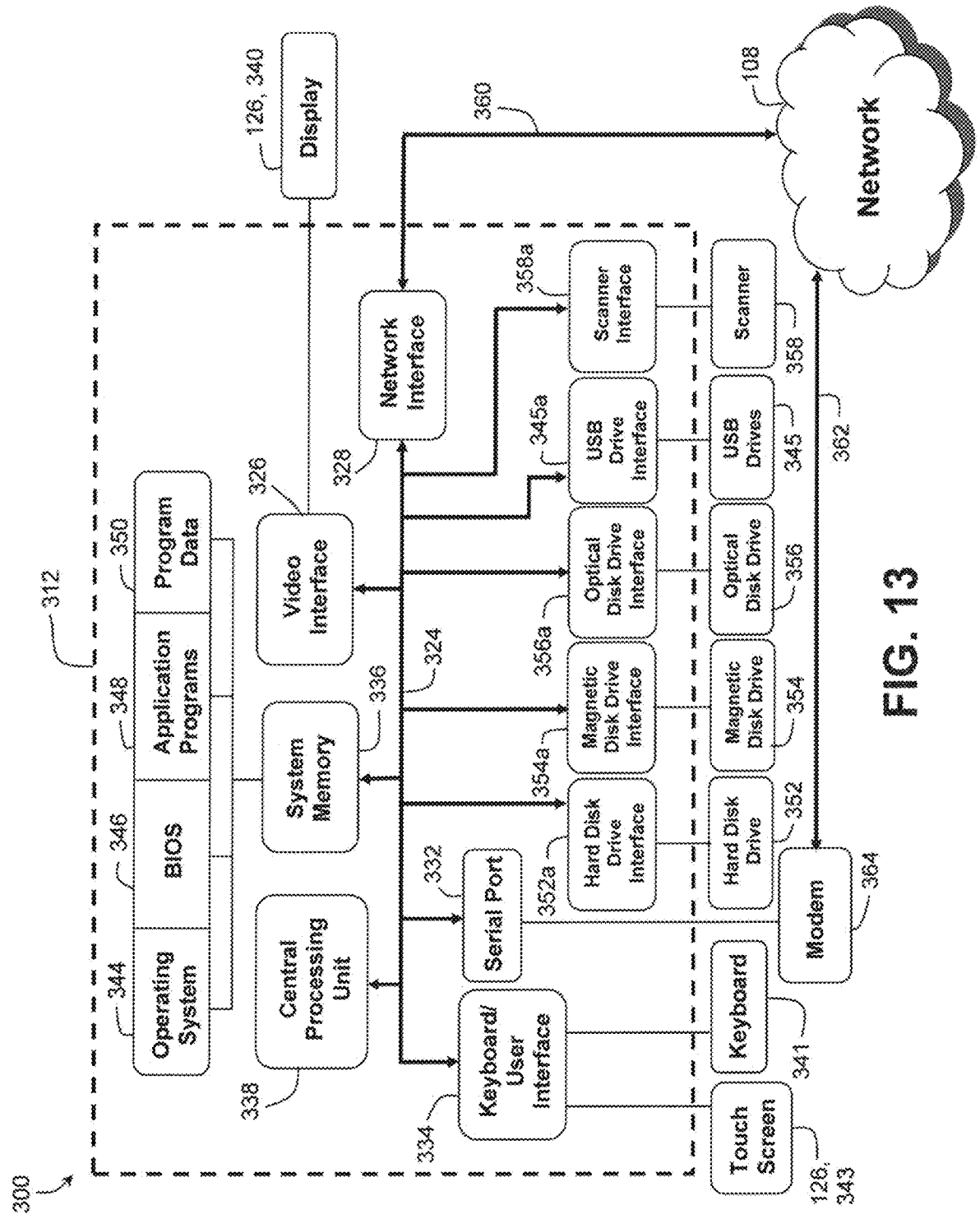
FIG. 13 is a block diagram generally illustrating a computing environment in which the invention may be implemented.

FIG. 13 shows an exemplary computing environment 300 that can be used to implement any of the processing thus far described. Computing environment 300 may include one or more computers 312 (such as server 102, mobile computing device 104, photofinishing system 106) comprising a system bus 324 that couples a video interface 326, network interface 328, a keyboard/mouse interface 334, and a system memory 336 (e.g., memory 110, 114, 128) to a Central Processing Unit (CPU) 338. A display 340 is connected to bus 324 by video interface 326 and provides the user with a graphical user interface to view video 205, view and select digital overlays 136, and view, edit, and prepare a print order using one or more digital images. The graphical user interface allows the user to enter commands and information into computer 312 using a keyboard 341 and a user interface selection device 343, such as a mouse, touch screen, or other pointing device. Keyboard 341 and user interface selection device 343 may be connected to bus 324 through keyboard/mouse interface 334. The display 340 and user interface selection device 343 are used in combination to form the graphical user interface which allows the user to implement at least a portion of the present invention. Other peripheral devices may be connected to the remote computer through universal serial bus (USB) drives 345 to transfer information to and from computer 312. For example, cameras and camcorders may be connected to computer 312 through serial port 332 or USB drives 345 so that data representative of a digital image, digital overlay, or video may be displayed on display 340 downloaded to system memory 336 or another memory storage device associated with computer 312 such that the digital images may be subsequently printed on a selected physical product by photofinishing system 106.

The system memory 110, 128, 336 is also connected to bus 324 and may include read only memory (ROM), random access memory (RAM), an operating system 344, a basic input/output system (BIOS) 346, application programs 348 and program data 350. The computer 312 may further include a hard disk drive 352 for reading from and writing to a hard disk, a magnetic disk drive 354 for reading from and writing to a removable magnetic disk (e.g., floppy disk), and an optical disk drive 356 for reading from and writing to a removable optical disk (e.g., CD ROM or other optical media). The computer 312 may also include USB drives 345 and other types of drives for reading from and writing to flash memory devices (e.g., compact flash, memory stick/PRO and DUO, SD card, multimedia card, smart media xD card), and a scanner 358 for scanning items such as digital images to be downloaded to computer 312. A hard disk drive interface 352a, magnetic disk drive interface 354a, an optical drive interface 356a, a USB drive interface 345a, and a scanner interface 358a operate to connect bus 324 to hard disk drive 352, magnetic disk drive 354, optical disk drive 356, USB drive 345 and scanner 358, respectively. Each of these drive components and their associated computer-readable media may provide computer 312 with non-volatile storage of computer-readable instruction, program modules, data structures, application programs, an operating system, and other data for computer 312. In addition, it will be understood that computer 312 may also utilize other types of computer-readable media in addition to those types set forth herein, such as digital video disks, random access memory, read only memory, other types of flash memory cards, magnetic cassettes, and the like.

Computer 312 may operate in a networked environment using logical connections with each of the system components described above. Network interface 328 provides a communication path 360 between bus 324 and network 108, which allows, for example, a print order, digital image, unique payment link, unique identifier, input identifier, token ID, payment authorization, notification, inquiry, and the identified and selected substrate to be communicated through network 108 between the respective components of system 200. This type of logical network connection is commonly used in conjunction with a local area network (LAN). These items may also be communicated from bus 324 through a communication path 362 to network 108 using serial port 332 and a modem 364. Using a modem connection between the computer 312 and the other components of system 100 is commonly used in conjunction with a wide area network (WAN). It will be appreciated that the network connections shown herein are merely exemplary, and it is within the scope of the present invention to use other types of network connections between computer 312 and the other components of system 100 including both wired and wireless connections.

In utilizing the system and method in accordance with the present invention, numerous advantages are realized. For example, leveraging the use of a user's mobile computing device to select and order a print product eliminates the need for providing a photo kiosk in a retail location. This is beneficial in that it is a significant cost savings not to have to design, manufacture and provide photo kiosks to multiple retail locations. In many cases, all that would need to be provided to implement the present invention are one or more representative samples of exhibited products so a user can observe and evaluate a physical representation of the products that are available for purchase, and take a video of such exhibited products. The digital version of the available products that are typically displayed to the user on a kiosk is not as beneficial. Furthermore, it can be arranged so that all of the exhibited products at the retail locations are the same, which will allow the image and/or object recognition functionality to operate with consistency across the retail locations.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A computing system for providing a customized print product, the system comprising:
 a first memory for storing computer-executable instructions; and
 a processor configured for executing the computer-executable instructions to perform the following steps:
  a) providing for a display of a video that includes an exhibited physical product;
  b) comparing one or more feature or attribute associated with the exhibited physical product being displayed in the video with feature data or attribute data associated with an available product, wherein the feature data or the attribute data is stored in the first memory;
  c) upon determining that the displayed exhibited physical product corresponds to the available product, providing for a display of a digital overlay in the video and in association with the displayed exhibited physical product;
  d) allowing for the selection of the digital overlay being displayed in the video; and
  e) in response to the selection of the digital overlay, allowing for the selection of a digital image to customize the displayed exhibited physical product, wherein the selected digital image is not representative of the displayed exhibited physical product, and wherein the selected digital image is configured to be disposed on a selected physical product representative of the displayed exhibited physical product associated with the selected digital overlay to provide the customized print product.

2. A system in accordance with claim 1, wherein the feature data of the available product includes a stock digital image, wherein the one or more feature of the exhibited physical product is a stock image, wherein step c) includes scanning the displayed exhibited physical product to identify the stock image disposed thereon, and wherein the displayed exhibited physical product corresponds to the digital representation of the available product when the stock image matches the stock digital image.

3. A system in accordance with claim 1, wherein the attribute data includes at least one dimension of the available product, wherein step c) includes scanning the displayed exhibited physical product to identify the at least one dimension of the displayed exhibited physical product, and wherein the displayed exhibited physical product corresponds to the available product when the at least one dimension of the displayed exhibited physical product matches the at least one dimension of the available product.

4. A system in accordance with claim 1, wherein the attribute data includes at least one shape of the available product, wherein step c) includes scanning the displayed exhibited physical product to identify the at least one shape of the displayed exhibited physical product, and wherein the displayed exhibited physical product corresponds to the available product when the at least one shape of the displayed exhibited physical product matches the at least one shape of the available product.

5. A system in accordance with claim 1, further comprising a mobile computing device including a camera, a display, and a second memory, wherein the camera is configured for capturing the video, and wherein the display is configured for displaying the video.

6. A system in accordance with claim 5, wherein the digital image is stored in the second memory.

7. A system in accordance with claim 5, wherein the display includes a touch screen, and wherein the selection of the digital overlay is performed using the touch screen.

8. A system in accordance with claim 1, wherein data representing the digital overlay is stored in the first memory.

9. A system in accordance with claim 1, wherein the digital image is stored in the first memory.

10. A system in accordance with claim 1, wherein the digital image is stored in a remote server, wherein the remote server is in communication with the processor over a network.

11. A system in accordance with claim 10, wherein the remote server is a remote social media server.

12. A system in accordance with claim 1, wherein the step of providing for the display of the digital overlay in association with the displayed exhibited physical product includes superimposing the digital overlay on top of the displayed exhibited physical product.

13. A system in accordance with claim 12, wherein the digital overlay is displayed in the same perspective as the exhibited physical product is displayed in the video.

14. A system in accordance with claim 1, wherein the video is a real-time video.

15. A system in accordance with claim 1, further comprising, subsequent to step e), the additional step of providing for a display of a digital representation of the customized print product, wherein the digital representation of the customized print product includes:
 the selected digital image; and
 a digital representation of the displayed exhibited physical product associated with the selected digital overlay.

16. A system in accordance with claim 15, wherein the digital representation of the customized print product is displayed in the video superimposed on the exhibited physical product.

17. A system in accordance with claim 1, wherein the digital overlay includes a description of the displayed exhibited physical product.

18. A system in accordance with claim 1, wherein a plurality of digital images are stored in the first memory, and wherein the digital image is selected from the plurality of digital images.

19. A system in accordance with claim 1, wherein a plurality of digital images are stored in a remote server, wherein the remote server is in communication with the processor over a network, and wherein the digital image is selected from the plurality of digital images.

20. A system in accordance with claim 19, wherein the remote server is a remote social media server.

21. A computer-implemented method programmed for execution in a computing environment for providing a custom print product, the method comprising:
 a) providing for a display of a video that includes an exhibited physical product;
 b) comparing one or more feature or attribute associated with the exhibited physical product being displayed in the video with feature data or attribute data associated with the available product, wherein the feature data or the attribute data is stored in a memory;
 c) upon determining that the displayed exhibited physical product corresponds to the available product, providing for a display of a digital overlay in the video and in association with the displayed exhibited physical product;

d) allowing for the selection of the digital overlay being displayed in the video; and e) in response to the selection of the digital overlay, allowing for the selection of a digital image, wherein the selected digital image is not representative of the displayed exhibited physical product, and wherein the selected digital image is configured to be disposed on a selected physical product representative of the displayed exhibited physical product associated with the selected digital overlay to provide the customized print product.

22. A non-transitory computer-readable medium having instructions stored thereon, the non-transitory computer-readable medium comprising:

digital storage; and computer-readable instructions stored on the digital storage operable upon execution by a processor steps for providing a custom print product, the steps comprising:

a) providing for a display of a video that includes an exhibited physical product;

b) comparing one or more feature or attribute associated with the exhibited physical product being displayed in the video with feature data or attribute data associated with the available product, wherein the feature data or the attribute data is stored in a memory;

c) upon determining that the displayed exhibited physical product corresponds to the available product, providing for a display of a digital overlay in the video and in association with the displayed exhibited physical product;

d) allowing for the selection of the digital overlay being displayed in the video; and e) in response to the selection of the digital overlay, allowing for the selection of a digital image, wherein the selected digital image is not representative of the displayed exhibited physical product, and wherein the selected digital image is configured to be disposed on a selected physical product representative of the displayed exhibited physical product associated with the selected digital overlay to provide the customized print product.

23. A non-transitory computer-readable medium in accordance with claim 22, wherein the feature data of the available product includes a stock digital image, wherein the one or more feature of the exhibited physical product is a stock image, wherein step c) includes scanning the displayed exhibited physical product to identify the stock image disposed thereon, and wherein the displayed exhibited physical product corresponds to the digital representation of the available product when the stock image matches the stock digital image.

24. A non-transitory computer-readable medium in accordance with claim 22, wherein the attribute data includes at least one dimension of the available product, wherein step c) includes scanning the displayed exhibited physical product to identify the at least one dimension of the displayed exhibited physical product, and wherein the displayed exhibited physical product corresponds to the available product when the at least one dimension of the displayed exhibited physical product matches the at least one dimension of the available product.

25. A non-transitory computer-readable medium in accordance with claim 22, wherein the attribute data includes at least one shape of the available product, wherein step c) includes scanning the displayed exhibited physical product to identify the at least one shape of the displayed exhibited physical product, and wherein the displayed exhibited physical product corresponds to the available product when the at least one shape of the displayed exhibited physical product matches the at least one shape of the available product.

26. A non-transitory computer-readable medium in accordance with claim 22, wherein the step of providing for the display of the digital overlay in association with the displayed exhibited physical product includes superimposing the digital overlay on top of the displayed exhibited physical product.

27. A non-transitory computer-readable medium in accordance with claim 26, wherein the digital overlay is displayed in the same perspective as the exhibited physical product is displayed in the video.

28. A non-transitory computer-readable medium in accordance with claim 22, wherein the video is a real-time video.

29. A non-transitory computer-readable medium in accordance with claim 22, further comprising, subsequent to step e), the additional step of providing for a display of a digital representation of the customized print product, wherein the digital representation of the customized print product includes:

the selected digital image; and a digital representation of the displayed exhibited physical product associated with the selected digital overlay.

30. A non-transitory computer-readable medium in accordance with claim 29, wherein the digital representation of the customized print product is displayed in the video superimposed on the exhibited physical product.

31. A computer-implemented method in accordance with claim 21, wherein the feature data of the available product includes a stock digital image, wherein the one or more feature of the exhibited physical product is a stock image, wherein step c) includes scanning the displayed exhibited physical product to identify the stock image disposed thereon, and wherein the displayed exhibited physical product corresponds to the digital representation of the available product when the stock image matches the stock digital image.

32. A computer-implemented method in accordance with claim 21, wherein the attribute data includes at least one dimension of the available product, wherein step c) includes scanning the displayed exhibited physical product to identify the at least one dimension of the displayed exhibited physical product, and wherein the displayed exhibited physical product corresponds to the available product when the at least one dimension of the displayed exhibited physical product matches the at least one dimension of the available product.

33. A computer-implemented method in accordance with claim 21, wherein the attribute data includes at least one shape of the available product, wherein step c) includes scanning the displayed exhibited physical product to identify the at least one shape of the displayed exhibited physical product, and wherein the displayed exhibited physical product corresponds to the available product when the at least one shape of the displayed exhibited physical product matches the at least one shape of the available product.

34. A computer-implemented method in accordance with claim 21, wherein the step of providing for the display of the digital overlay in association with the displayed exhibited physical product includes superimposing the digital overlay on top of the displayed exhibited physical product.

35. A computer-implemented method in accordance with claim 34, wherein the digital overlay is displayed in the same perspective as the exhibited physical product is displayed in the video.

36. A computer-implemented method in accordance with claim 21, wherein the video is a real-time video.

37. A computer-implemented method in accordance with claim 21, further comprising, subsequent to step e), the additional step of providing for a display of a digital representation of the customized print product, wherein the digital representation of the customized print product includes:
   the selected digital image; and
   a digital representation of the displayed exhibited physical product associated with the selected digital overlay.

38. A computer-implemented method in accordance with claim 37, wherein the digital representation of the customized print product is displayed in the video superimposed on the exhibited physical product.

* * * * *